(12) United States Patent
Plutowski (10) Patent No.: US 6,777,899 B1
(45) Date of Patent: Aug. 17, 2004

(54) CIRCUIT AND METHOD FOR REMOVING INCREASED POWER SUPPLY CURRENT SPIKE THAT OCCURS DURING INITIAL TURN-ON OR COMMUTATION POINT IN PWM MODE SPINDLE MOTOR DRIVE SYSTEM

(75) Inventor: Eugene Francis Plutowski, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/249,553

(22) Filed: Apr. 17, 2003

(51) Int. Cl.[7] .............................................. H02K 23/00
(52) U.S. Cl. ........................ 318/254; 318/439; 318/138; 318/700
(58) Field of Search ................................ 318/254, 138, 318/439, 700, 434, 727

(56) References Cited

U.S. PATENT DOCUMENTS 6,396,225 B1 * 5/2002 Wakui et al. ............... 318/254
6,448,724 B1 * 9/2002 Kleinau et al. ............. 318/254
6,483,270 B1 * 11/2002 Miyazaki et al. ........... 318/700

* cited by examiner

*Primary Examiner*—Karen Masih
(74) *Attorney, Agent, or Firm*—W. Daniel Swayze, Jr.; W. James Brady; Frederick J. Telecky, Jr.

(57) ABSTRACT

A method and circuit (55) are presented for reducing a current spike (9) created after a commutation of a driving current of a polyphase motor (14). The motor (14) has a plurality of coils (40) that are driven by a commutated dc voltage from a power supply. The circuit (55) includes a circuit that produces a signal (DrvENOccurred) for indicating a commutation of the dc voltage and a circuit for PWM modulating the dc voltage (CLK,74) during at least a portion of a time before a current induced in one of the coils (40) reaches a peak value. A counter (57) determines at least a portion of a time that begins a delayed time after the commutation, and ends when the current reaches the peak value.

37 Claims, 5 Drawing Sheets

CIRCUIT AND METHOD FOR REMOVING INCREASED POWER SUPPLY CURRENT SPIKE THAT OCCURS DURING INITIAL TURN-ON OR COMMUTATION POINT IN PWM MODE SPINDLE MOTOR DRIVE SYSTEM

BACKGROUND OF INVENTION

1. Field of Invention

This invention relates to improvements in methods and circuits for operating polyphase motors, such as a spindle motor of a mass data storage device, or the like, and more particularly to improvements in such driving methods and circuits that at least reduce the effects of current spikes that may occur in conjunction with a turn-on or commutation transition of driving currents in such motor.

2. Relevant Background

This invention relates primarily to improvements in circuitry for use in the operation of spindle motors of mass data storage devices, although it may be used in other motor applications, as well. Mass data storage devices include tape drives, as well as hard disk drives that have one or more spinning magnetic disks or platters onto which data is recorded for storage and subsequent retrieval. Mass data storage devices may also include optical disks in which the optical properties of a spinning disk are locally varied to provide a reflectivity gradient that can be detected by a laser transducer head, or the like. Hard disk drives may be used in many applications, including personal computers, set top boxes, video and television applications, audio applications, or some mix thereof. Optical disks may be used, for example, to contain data, music, or other information. Applications for hard disk drives are increasing in number, and are expected to further increase in the future.

Typically, mass data storage devices use polyphase, usually three-phase, DC motors to rotate the memory media. A typical polyphase motor has a "Y" connected coil assembly driven by three respective MOS driving circuits Each driving circuit typically has a pull-up and a pull-down transistor connected in series between a supply rail and a reference potential, or ground. The pull-up transistors are generally referred to as "high-side drivers" (HSDs), and the pull-down transistors are generally referred to as "low-side drivers" (LSDs). The node between the high and low side drivers of each driving circuit is connected to a respective end of one of the motor coils. The respective high and low side driver transistors are controlled by a sequencer or commutator circuit (not shown) in known manner to operate the circuit in successive states to direct a drive current through selected coils of the motor to spin it.

In the operation of such polyphase motors, pulse width modulation (PWM) techniques are often employed. PWM techniques are used to vary the duty cycle of the driving waveform so that a sensed average motor current matches a current command signal representing the desired motor speed. In normal PWM operation of the bridge FETs, since the PWM frequency is sufficiently high, the bulk capacitance of the power supply is generally able to contribute part of the current needed by the spindle motor current control loop.

However, when a low side driver transistor is commutated to draw current, the current through the transistor must rise from zero to the peak current. During this time, PWM operation is not employed, and the current pulse can become very wide relative to the current pulses seen during normal PWM chopping of the driver transistors. This reduced frequency may have the effect of totally draining the bulk capacitance of the power supply. When the bulk capacitance is drained, it no longer is able to contribute current to the motor. Thus, during this time, all current comes from the power supply. The result is that shortly after the commutation point of the low-side driver transistors, the current seen at the power supply has a current spike that is higher than the current seen during normal PWM operation.

Figure 1:
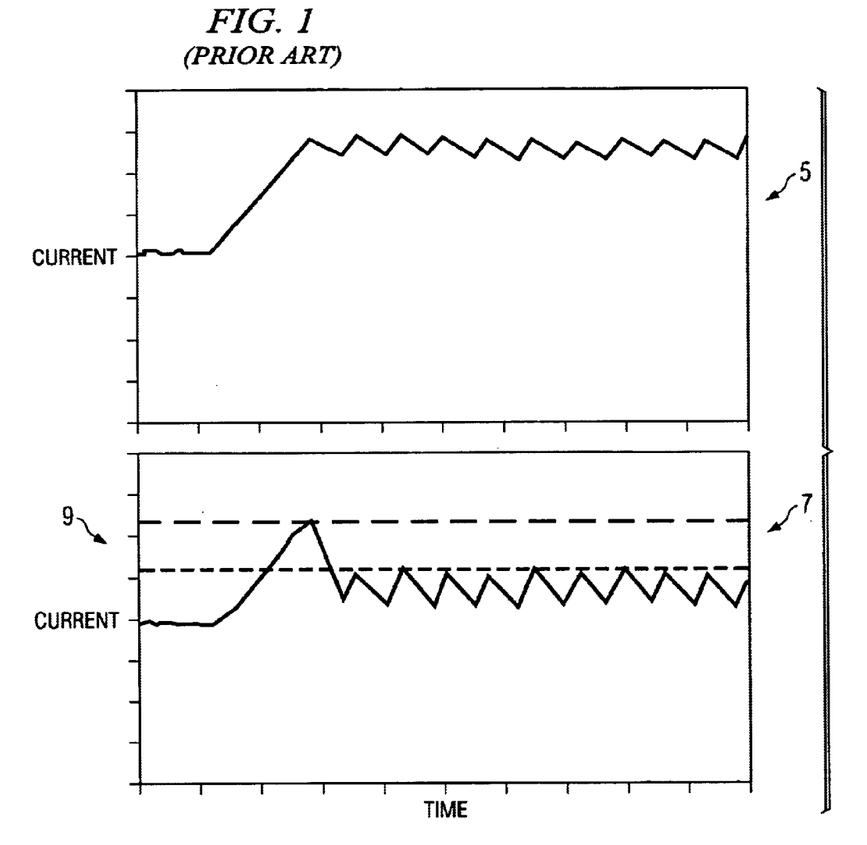
FIG. 1 is a pair of juxtaposed graphs of current vs time, according to the prior art, the upper graph being commutation current, and the lower graph being power supply current.

The nature of this current spike is shown in FIG. 1, to which reference is now made. As shown, the commutation current 5 is illustrated as a function of time, in comparison to the power supply current 7. This can be seen, after the initial ramp up of the commutation current in graph 5, the power supply current in graph 7 similarly begins to ramp up. However, as shown, a spike 9 occurs, which is undesirable.

What is needed, therefore, Is a method and circuit for substantially reducing or eliminating the current spike that is seen by the power supply after a commutation of the driving current of a polyphase motor.

SUMMARY OF INVENTION

In light of the above, therefore, it is an advantage of the invention that the current spike that may be seen by the power supply after a turn-on or commutation of the driving current of a polyphase motor can be reduced or eliminated.

It is another advantage of the invention that the solution advanced herein is an adaptive as to the number of extra PWM cycles required to reach the peak current.

It is another advantage of the invention that the technique described herein minimizes the number of cycles through the use of a timeout timer used prior to actually adding the extra PWM cycles.

It is yet another advantage of the invention that the added PWM cycles need not have a 50 percent duty cycle, but can be selected according to the application.

Thus, according to a broad aspect of the invention, a method is presented for reducing a current spike created after a commutation of a driving current of a polyphase motor. The method includes timing a first delay after the commutation of the driving current. Thereafter, the driving current pulse width modulated, and a determination is made when the driving current has reached a predetermined value. Finally, the pulse width modulating is discontinued. In a preferred embodiment, normal PWM modulation of the dc voltage is resumed after the current induced in the one of the coils has reached a peak value. According to another broad aspect of the Invention, a method is presented for operating a polyphase motor. The method includes timing a first delay after a commutation of a driving current of the motor, and thereafter, pulse width modulating the driving current. A determination is made determining when the driving current has reached a predetermined value, and thereafter, the pulse width modulating is discontinued. Finally, a normal pulse width modulation is applied to the driving current.

According to yet another broad aspect of the invention, a circuit for driving a polyphase motor having a plurality of coils that are driven by a commutated dc voltage from a power supply. The circuit includes a circuit for detecting a commutation of the dc voltage and a circuit for reducing a current spike in the dc voltage from the power supply a time before a current induced in one of the coils reaches a peak value. In a preferred embodiment, the circuit for reducing a current spike in the dc voltage from the power supply is a circuit for PWM modulating the dc voltage during at least a portion of a time before a current induced in one of the coils reaches a peak value. In a preferred embodiment, the at least a portion of a time begins a delayed time after the commutation and ends when the current reaches the peak value. Also, in a preferred embodiment, a circuit is provided for additionally PWM modulating the dc voltage after the current induced in the one of the coils has reached a peak value.

According to yet another broad aspect of the invention, a circuit is provide for driving a polyphase motor having a plurality of coils that are driven by a commutated dc voltage from a power supply. The circuit includes a circuit for detecting a commutation of the dc voltage and a circuit for PWM modulating the dc voltage during at least a portion of a time before a current induced in one of the coils reaches a peak value. In a preferred embodiment, the at least a portion of a time begins a delayed time after the commutation and ends when the current reaches the peak value. In a preferred embodiment, a circuit is also provided for additionally PWM modulating the dc voltage after the current induced in the one of the coils has reached a peak value.

In still yet another broad aspect of the invention, a circuit is provided for driving a polyphase motor having a plurality of coils that are driven by a commutated dc signal from a power supply. The circuit includes a circuit for detecting a commutation of the dc voltage and a circuit for timing a delay time after the commutation. A circuit is provided for PWM modulating the dc voltage after the delay time, and a circuit is provided for discontinuing the PWM modulating after a current induced in one of the coils has reached a peak value. In a preferred embodiment, the at least a portion of a time begins a delayed time after the commutation and ends when the current reaches the peak value. In a preferred embodiment, a circuit is provided for additionally PWM modulating the dc voltage after the current induced in the one of the coils has reached a peak value.

According to another broad aspect of the invention, a circuit is provided for driving a polyphase motor having a plurality of coils that are driven by a commutated dc signal from a dc power supply. The circuit includes a gate having first and second inputs and having an output connected to deliver drive signals for application to one of the coils. A source of clock pulses is connected to the first input of the gate, and a detection circuit detects a commutation of the dc voltage.

A counter circuit counts to a start time after the detection circuit detects the commutation and before a current induced in the one of the coils has reached a peak value to deliver a start signal to the second input of the gate, wherein the output of the gate includes PWM signals after the start time. A circuit is also provided for discontinuing the PWM signals after the current induced in the one of the coils has reached the peak value. In a preferred embodiment, a circuit is also provided for additionally PWM modulating the dc voltage after the current induced in the one of the coils has reached a peak value.

According to yet still another broad aspect of the invention, a mass data storage device is provided. The mass data storage device includes a polyphase motor having a plurality of coils and a dc power supply to supply a dc voltage. A commutator circuit commutates the dc voltage for application to selected ones of the coils, and a plurality of gates are provided, each having first and second inputs and having an output connected to deliver drive signals for application to a respective one of the coils. A detection circuit detects a commutation of the dc voltage by the commutator circuit. A source of clock pulses Is connected to the first inputs of the gates, and a counter circuit counts to a start time after the detection circuit detects the commutation and before a current induced in the one of the coils has reached a peak value to deliver a start signal to the second input of the gate. The output of the gate therefore includes PWM signals after the start time. A circuit discontinues the PWM signals after the current induced in the one of the coils has reached the peak value. In a preferred embodiment, a circuit is provided for additionally PWM modulating the dc voltage after the current induced in the one of the coils has reached a peak value.

BRIEF DESCRIPTION OF DRAWINGS

And a FIG. 6D is a series of waveforms created in the operation of the circuit of FIG. 4, in accordance with a preferred embodiment of the invention.

DETAILED DESCRIPTION

Figure 2:
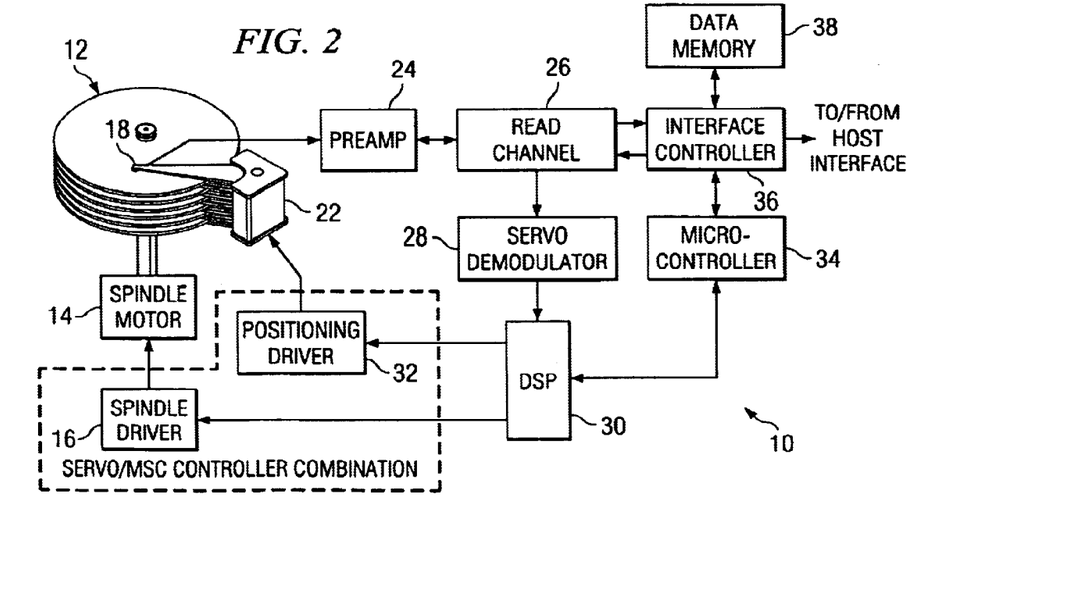
FIG. 2 is a block diagram of a generic disk drive system, illustrating the general environment In which the invention may be practiced.

FIG. 2 is a block diagram of a generic disk drive system 10, which represents the general environment in which the invention may be practiced. The system includes a magnetic media disk 12 that is rotated by a spindle motor 14 and spindle driver circuit 16, aspects of which being described below in greater detail. A data transducer or head 18 is locatable along selectable radial tracks (not shown) of the disk 12 by a voice coil motor 22. The radial tracks may contain magnetic states that contain Information about the tracks, such as track identification data, location information, synchronization data, as well as user data, and so forth. The head 18 is used both to record user data to and read user data back from the disk 12, as well as to detect signals that identify the tracks and sectors at which data is written, and to detect servo bursts that enable the head 18 to be properly laterally aligned with the tracks of the disk 12.

Analog electrical signals that are generated by the head 18 in response to the magnetic signals recorded on the disk 12 are preamplified by a preamplifier 24 for delivery to read channel circuitry 26. Servo signals are detected and demodulated by one or more servo demodulator circuits 28 and processed by a digital signal processor 30 (DSP) to control the position of the head 18 via the positioning driver circuit 32. The servo data that is read and processed may be analog data that is interpreted by the DSP 30 for positioning the head 18.

A microcontroller 34 is typically provided to control the DSP 30, as well as an interface controller 36 to enable data to be passed to and from a host interface (not shown) in known manner. A data buffer or memory 38 may be provided, if desired, to buffer data being written to and read from the disk 12.

Figure 3:
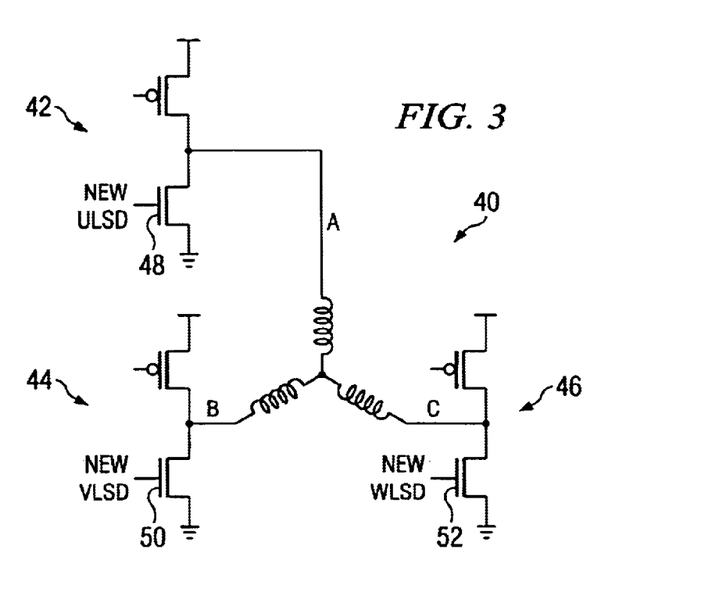
FIG. 3 is an electrical schematic diagram showing a typical connection of driver transistors to coils of a multiphase spindle motor, with low side driver signals applied, In accordance with a preferred embodiment of the invention.

A typical polyphase motor driving circuit and coils 40 is shown in FIG. 3, to which reference is now additionally made. The circuit 40 includes three MOS driving circuits 42, 44, and 46, having their respective midpoints connected to nodes "A", "B", and "C". Each driving circuit 42, 44, and 46 has respective pull-up and pull-down transistors connected between a supply rail and a reference potential, as shown. The respective transistors are controlled by a sequencer circuit (not shown) in known manner to operate the circuit 40 in successive ones of six states. The states, for example, may be defined by successive current paths A–C, B–C, B–A, C–A, C–B, and A–B. The low side driver transistors 48, 50, and 52 are respectively driven by drive signals denoted as "new ULSD", "new VLSD", and "new WLSD", which are derived from the circuit 55 described in greater detail below in conjunction with FIG. 4.

As described above in conjunction with FIG. 1, in the past, at start-up and at commutation points, ordinarily, a current spike is undesirably produced during the turn-on of the PWM driver that can affect the power supply. The present invention is intended to substantially remove or eliminate this current spike. Thus, according to the present invention, PWM cycles are introduced during at least a portion of the turn-on time of the PWM driver. To maximize the current rise time, a counter is operated to a timeout amount value during which time the current is turned on hard. After the timeout expires, a number of PWM cycles are added until the current reaches the peak commanded current. Thereafter, a normal PWM mode of operation may be commenced, if desired.

Figure 4:
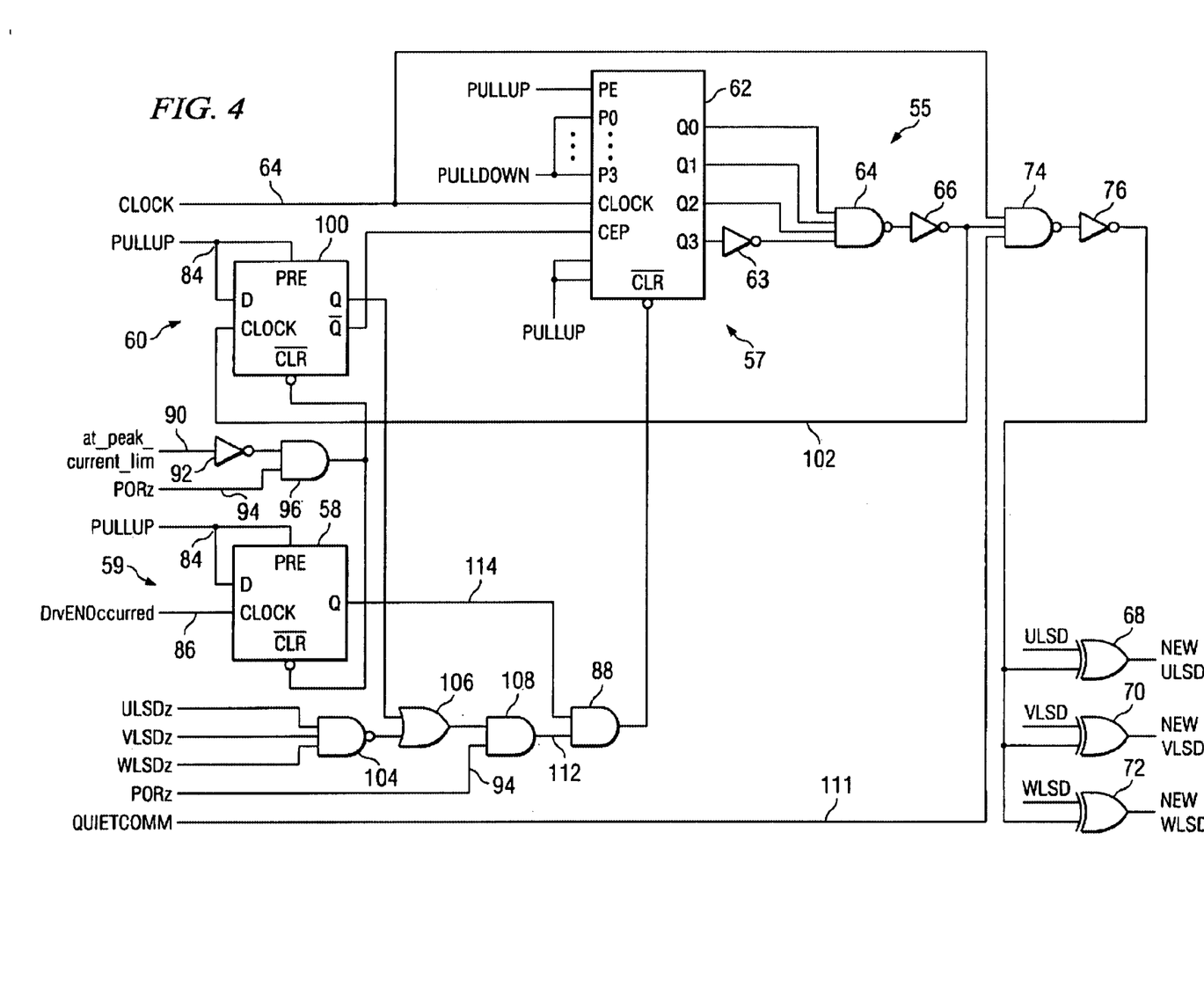
FIG. 4 is an electrical schematic diagram showing circuitry for generating the new low side driver signals for application to the low side driver transistors of FIG. 3, in accordance with a preferred embodiment of the invention.

The circuit 55 referred to above for creating the additional PWM cycles is shown in greater detail in FIG. 4, to which reference is now additionally made. The circuit 55 includes a timeout counter circuit 57 that times the period during which the additional PWM pulses are used to drive the lower driver transistors 48, 50, and 52 during the period following a commutation until the current in the lower driver reaches a peak current value. A first latch circuit 59 is used to start the timeout counter circuit 57, and a second latch 60 is used to stop the application of the additional PWM signals.

The timeout counter circuit 57 includes a binary counter 62 that is clocked by a clock signal on line 64 to produce parallel count outputs that are applied to a NAND gate 64. The output from the NAND gate 64 is inverted by an inverter 66 and applied to an appropriate coil on a selected low side driver coil through exclusive OR gates 68, 70, and 72, the signals being denoted "New ULSD", "New VLSD", and "New WLSD", corresponding to the like labeled signals in FIG. 3.

Thus, it can be seen that as the counter 62 begins its count, the output from the NAND gate 64 and inverter 66 will remain low until the all of the outputs Q0, Q1, and Q2 reach high states. The output Q3 is low until its count is reached, but the low value is inverted by an inverter 63. Consequently, when outputs Q0, Q1, and Q2 reach their respective counts, the output from the inverter 102 will change states. This will allow clock pulses on line 64 to pass the NAND agate 74 and inverter 75 (if the other conditions below described are met), and will also clock the latch 60, below described, to stop further count by the counter 62.

At that point the coil control signal will be applied to the lower inputs of exclusive or gates 66, 70, and 72. Since the clock signal on line 64 is applied as an input to the NAND gate 74, during the time that the timer operates, the clock signal is applied via the NAND gate 74 to the exclusive or gates 68, 70, and 72 to PWM modulate the drive signals applied to the low side driver transistors 48, 50, and 52, respective it should be noted that the frequency and/or duty cycle of the clock pulse can be varied as needed to achieve the desired current handling characteristics to avoid the discharge of the power supply capacitances. Also, it should be noted that the starting time of the PWM operation is delayed from the commutation point by a time established by the counter 62, and can also be varied, as needed.

As suggested above, the count of the counter 62 is enabled by the latch circuit 60. The latch circuit 60 includes a D-type flip-flop 100 having its D input connected to a pull-up voltage 84. The inverted Q output is connected to the count enable input (CEP) of the counter 62 to stop the count of the counter 62 when the D-type flip-flop is clocked by the output from the NAND gate 64 and inverter 66 on line 102. Thus, so long as the inverted Q output of the D type flip-flop 100 is low, the counter 62 is allowed to count. However, once the final count from the counter 62 has been reached, the output from the NAND gate 64 and inverter 66 changes state on line 102 to clock the pulled up D state to the Q output, thereby turning off count further count of the counter 62.

It should be noted that although the CLK input to the D-type flip-flip 100 is shown as being derived directly from the output of the NAND 64/inverter 66 circuits, additional circuitry may be provided to selectively vary or adjust the CLK signal. Thus, for example, a circuit (not shown) may be added that alters the duty cycle of the clock dependent upon what the DAC signal was that commanded the start current. Another approach may be to provide a register (not shown) that is programmable by the user to provide a selected duty cycle clock signal. In essence, enables the designer who provides the start routine to flexibly pick the CLK duty cycle, as desired.

The latch circuit 59 clears the timeout counter circuit 57 and allows it to begin counting from zero. More particularly, the latch circuit 59 has its D input connected to a pull-up voltage 84 and is clocked by a signal on line 86 that indicates that the drive enable signal has occurred (DrvENOccurred). (Although the drive enable occurred signal is illustrated, other signals, such as a signal indicating that a commutation state has occurred may also be used.) The Q output is connected via and gate 88 to clear the counter 62.

Latches 59 and 60 are reset by a signal entitled "at_peak_current_lim" on line 90. The "at_peak_current_lim" signal is high when the current in the active lower driver transistor is at a peak value; otherwise, it is low. The "at_peak_current_lim" signal is inverted by an inverter 92, and is compared with an inverted power-on-reset signal (PORz) in AND gate 96. Consequently, if the inverted power-on-reset signal on line 94 is high (i.e., power-on-reset is not asserted), and the inverted "at_peak_current_lim" is low (i.e., the current Is not at a peak value), the output from AND gate 96 resets the latches 59 and 60. Once reset, the latch 59 initializes the count of the counter 62 to zero, and latch 60 enables its count.

In addition to the conditions for clearing the timer 62, described above in detail, additional conditions are required. More particularly, the drive enable signal as well as the inverted low side drive signals must all be in a low state. These are compared in a NAND gate 104, the output of which is applied to an OR gate 106.

The Q output of the D-type flip-flop 100 is also applied as an input to the OR gate 106. The output from the OR gate 106 is applied to one input of an AND gate 108.

The inverted power-on-reset signal is applied on line 94 to the other input of the AND gate 108. Thus, when either the Q output of the D-type flip-flop 100 is high or the inverted power-on-reset line is high, the output from the AND gate 108 on line 112 is applied to the AND gate 88 to disable the clear signal developed by the latch of circuit 59 on line 114 to be applied to clear the counter 62. This action allows counter 57 to count if CEP equals a logic 1.

Additionally, the circuit 55 may be selectively enabled or disabled in any particular application, for_example by an overall circuit enable signal, denoted "QuietComm", which is asserted on line 111 to an input of NAND gate 74.

In operation, the timeout counter 62 and comparator 64 add a delay between the time that the commutation point is entered (or drivers first enabled) and when PWM cycles are added, prior to the current reaching the command peak threshold defined by "at_peak_current_lim". The counter 62 has three sources of resets: PORZ, the initial power-on-resets signal; ULSDz, VLSDz, or WLSDz, inverted gate driver signals to the bottom FETs 48, 50, and 52 (in this case n-channel FETs, but can be p-channel FETs, PNP transistors, or other appropriate devices).

Figure 5:
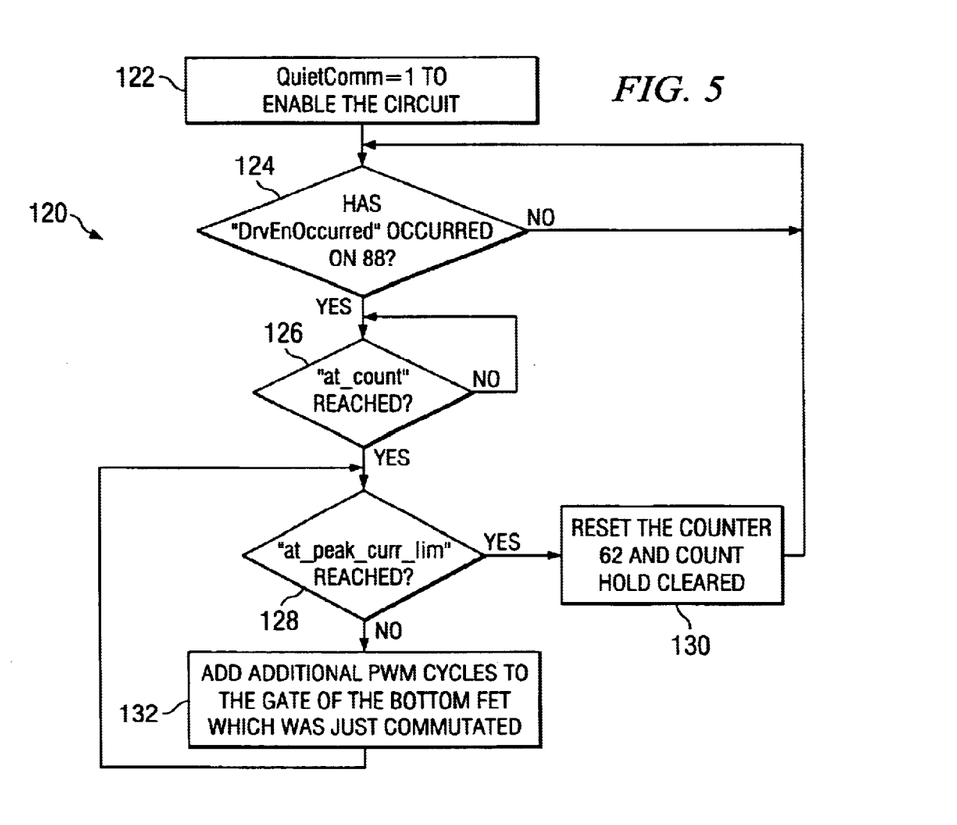
FIG. 5 is a flowchart with showing the steps of a circuit operation in performing the method for controlling power supply spikes, in accordance with a preferred embodiment of the invention.

A flowchart 120 illustrating the operation of the circuit 55 is shown in greater detail in FIG. 5, to which references now additionally made. As shown, the process begins by asserting the "QuietComm" signal on line 111, shown in box 122. Proceeding from box 122 to diamond 124, a determination is made whether the drive enable occurred signal (DrvEnOccurred) is rising. If not, the process loops back to redetermine the condition of the drive enable signal.

Once the rising drive enable signal is detected, the decision is made at diamond 126 whether "at_count" has been reached. "at_count" refers to the state of the output signals from the counter 62. The decision is repeated until the "at_count" has been reached, at which time a determination is made in diamond 128 whether the "at_peak_current_lim" signal indicates that the peak current has been reached. If so, the counter 62 is reset, indicated by box 0, and the process repeated, beginning in diamond 124. On other hand, if the "at_peak_current_lim" has not been reached, additional PWM cycles are added to the gate of the bottom FET, which was most recently commutated, indicated by box 132, and the "at_peak_current_lim" determination in diamond 128 is repeated.

Figure 6A:
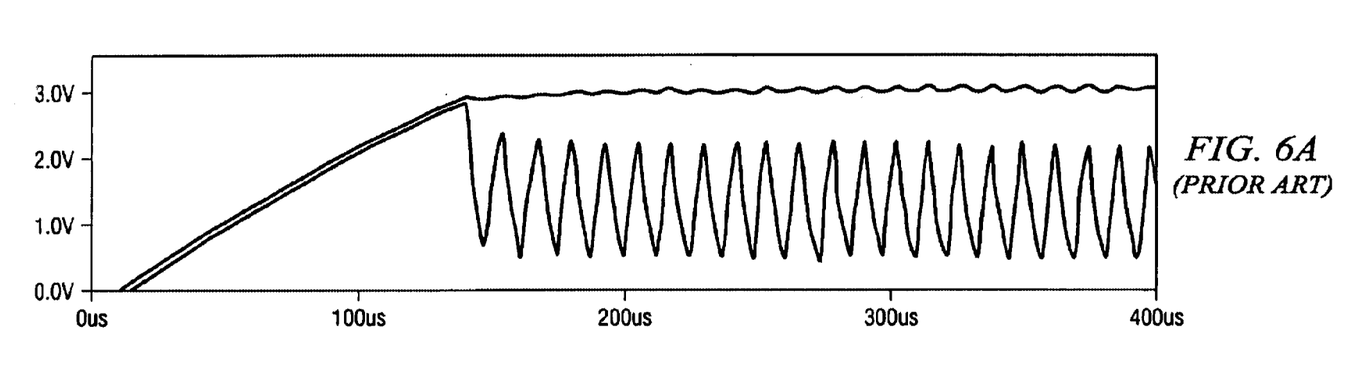
FIG. 6A is a graph of voltage vs. time, illustrating a power supply voltage (lower curve) and commutation voltage in the operation of a polyphase motor, In accordance with the prior art.
Figure 6B:
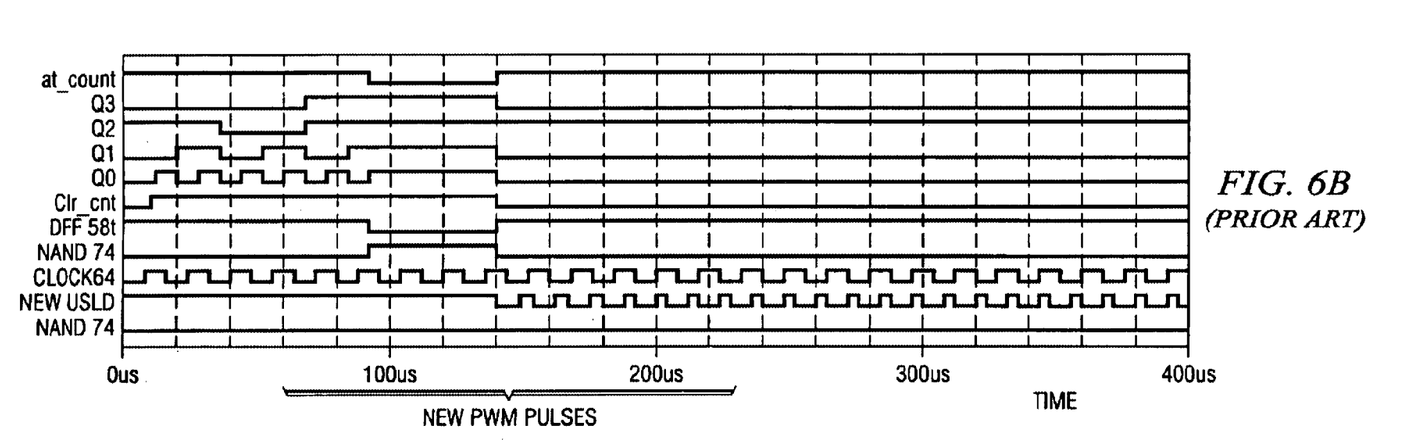
FIG. 6B is a series of waveforms showing the waveforms that would be seen in the circuit of FIG. 4, when operated in accordance with the prior art, resulting in the waveforms shown in FIG. 6A.

FIG. 6A shows a pair of juxtaposed graphs illustrating the correspondence between the power supply voltage, shown in the lower graph, with respect to the current that flows in the low side driver transistor, shown in the upper graph, when the circuit of FIG. 4 his operated a according to the prior art (i.e., no additional PWM pulses being generated). The waveforms that would be seen in the various nodes of the circuit of FIG. 4 are shown in FIG. 6.

Figure 6C:
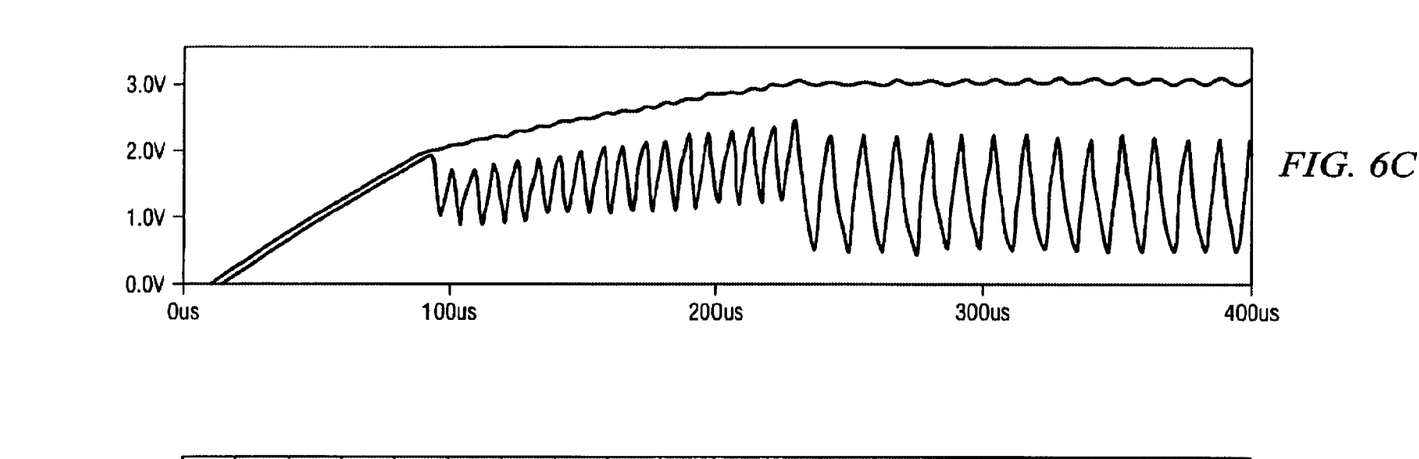
FIG. 6C is a pair of waveforms, corresponding to the waveforms of FIG. 6A, in which additional PWM pulses have been added, in accordance with a preferred embodiment of the invention.
Figure 6D:
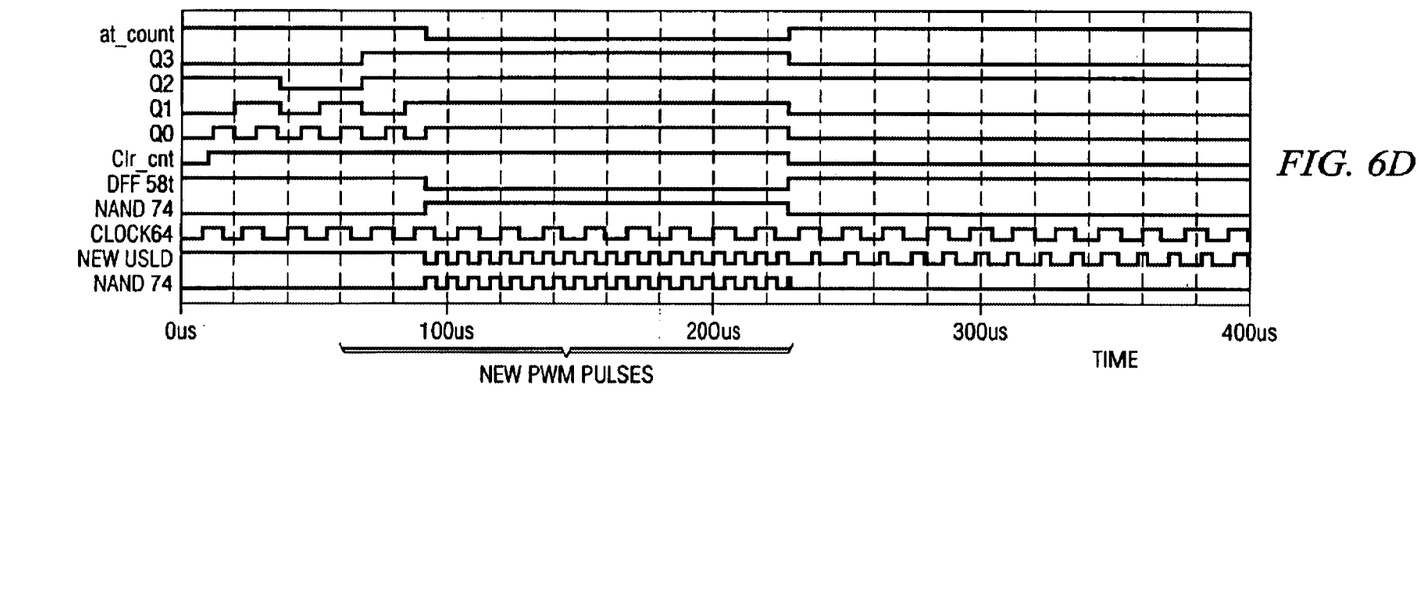

In contrast, when the circuit of FIG. 4 is operated in accordance with a preferred embodiment of the invention, the corresponding waveforms that results are shown in FIG. 6C. Similarly, the waveforms that are seen in the various identified nodes In the circuit of FIG. 4 are shown in FIG. 6. It should be noted that the power supply current spike that is seen in the lower graph in FIG. 6A has been eliminated, as can be seen by comparison of the corresponding lower waveforms shown in FIG. 6C. It should be noted that although the frequency of the additional PWM pulses are different from the following PWM pulses, they may be made of any convenient frequency. For example, the additional PWM pulses may be made of the same frequency as the normal PWM pulses.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for reducing a current spike created after a commutation of a driving current of a polyphase motor, comprising:

timing a first delay after said commutation of said driving current;

thereafter, pulse width modulating said driving current;

determining when said driving current has reached a predetermined value;

and thereafter, discontinuing said pulse width modulating.

2. The method of claim 1 wherein said pulse width modulating comprises pulse width modulating driving current with a duty cycle of about 50%.

3. The method of claim 1 wherein said pulse width modulating comprises pulse width modulating driving current with a duty cycle of more than about 50%.

4. The method of claim 1 wherein said pulse width modulating comprises pulse width modulating driving current with a duty cycle of less than about 50%.

5. A method for operating a polyphase motor, comprising:

timing a first delay after a commutation of a driving current of said motor;

thereafter, pulse width modulating said driving current;

determining when said driving current has reached a predetermined value;

thereafter, discontinuing said pulse width modulating;

and thereafter, applying a normal pulse width modulation to said driving current.

6. The method of claim 5 wherein said pulse width modulating comprises pulse width modulating driving current with a duty cycle of about 50%.

7. The method of claim 5 wherein said pulse width modulating comprises pulse width modulating driving current with a duty cycle of more than about 50%.

8. The method of claim 5 wherein said pulse width modulating comprises pulse width modulating driving current with a duty cycle of less than about 50%.

9. A circuit for driving a polyphase motor having a plurality of coils that are driven by a commutated dc voltage from a power supply, comprising:

a circuit for detecting a commutation of said dc voltage; and a circuit for reducing a current spike in said dc voltage from said power supply a time before a current induced in one of said coils reaches a peak value.

10. The circuit of claim 9 wherein said circuit for reducing a current spike in said dc voltage from said power supply is a circuit for PWM modulating said dc voltage during at least a portion of a time before a current induced in one of said coils reaches a peak value.

11. The circuit of claim 10 wherein said at least a portion of a time begins a delayed time after said commutation and ends when said current reaches said peak value.

12. The circuit of claim 10 wherein said circuit for PWM modulating said dc voltage produces a PWM modulated signal that has a 50% duty cycle.

13. The circuit of claim 10 wherein said circuit for PWM modulating said dc voltage produces a PWM modulated signal that has a duty cycle less than 50%.

14. The circuit of claim 10 wherein said circuit for PWM modulating said dc voltage produces a PWM modulated signal that has a duty cycle greater than 50%.

15. The circuit of claim 10 further comprising a circuit for additionally PWM modulating said dc voltage after said current induced in said one of said coils has reached a peak value.

16. A circuit for driving a polyphase motor having a plurality of coils that are driven by a commutated dc voltage from a power supply, comprising:
   a circuit for detecting a commutation of said dc voltage; and
   a circuit for PWM modulating said dc voltage during at least a portion of a time before a current induced in one of said coils reaches a peak value.

17. The circuit of claim 16 wherein said at least a portion of a time begins a delayed time after said commutation and ends when said current reaches said peak value.

18. The circuit of claim 16 wherein said circuit for PWM modulating said dc voltage produces a PWM modulated signal that has a 50% duty cycle.

19. The circuit of claim 16 wherein said circuit for PWM modulating said dc voltage produces a PWM modulated signal that has a duty cycle less than 50%.

20. The circuit of claim 16 wherein said circuit for PWM modulating said dc voltage produces a PWM modulated signal that has a duty cycle greater than 50%.

21. The circuit of claim 16 further comprising a circuit for additionally PWM modulating said dc voltage after said current induced in said one of said coils has reached a peak value.

22. A circuit for driving a polyphase motor having a plurality of coils that are driven by a commutated dc signal from a power supply, comprising:
   a circuit for detecting a commutation of said dc voltage;
   a circuit for timing a delay time after said commutation;
   a circuit for PWM modulating said dc voltage after said delay time; and
   a circuit for discontinuing said PWM modulating after a current induced in one of said coils has reached a peak value.

23. The circuit of claim 22 wherein said at least a portion of a time begins a delayed time after said commutation and ends when said current reaches said peak value.

24. The circuit of claim 22 wherein said circuit for PWM modulating said dc voltage produces a PWM modulated signal that has a 50% duty cycle.

25. The circuit of claim 22 wherein said circuit for PWM modulating said dc voltage produces a PWM modulated signal that has a duty cycle less than 50%.

26. The circuit of claim 22 wherein said circuit for PWM modulating said dc voltage produces a PWM modulated signal that has a duty cycle greater than 50%.

27. The circuit of claim 22 further comprising a circuit for additionally PWM modulating said dc voltage after said current induced in said one of said coils has reached a peak value.

28. A circuit for driving a polyphase motor having a plurality of coils that are driven by a commutated dc signal from a dc power supply, comprising:
   a gate having first and second inputs and having an output connected to deliver drive signals for application to one of said coils;
   a source of clock pulses connected to said first input of said gate;
   a detection circuit for detecting a commutation of said dc voltage;
   a counter circuit for counting to a start time after said detection circuit detects said commutation and before a current induced in said one of said coils has reached a peak value to deliver a start signal to said second input of said gate, wherein said output of said gate includes PWM signals after said start time;
   and a circuit for discontinuing said PWM signals after said current induced in said one of said coils has reached said peak value.

29. The circuit of claim 28 wherein said PWM signals are derived from said source of clock pulses and has a 50% duty cycle.

30. The circuit of claim 28 wherein said PWM signals are derived from said source of clock pulses and has a duty cycle greater than 50%.

31. The circuit of claim 28 wherein said PWM signals are derived from said source of clock pulses and has a duty cycle less than 50%.

32. The circuit of claim 28 further comprising a circuit for additionally PWM modulating said dc voltage after said current induced in said one of said coils has reached a peak value.

33. A mass data storage device, comprising:
   a polyphase motor having a plurality of coils;
   a dc power supply to supply a dc voltage;
   a commutator circuit for commutating said dc voltage for application to selected ones of said coils;
   a plurality of gates, each having first and second inputs and having an output connected to deliver drive signals for application to a respective one of said coils;
   a source of clock pulses connected to said first inputs of said gates;
   a detection circuit for detecting a commutation of said dc voltage by said commutator circuit;
   a counter circuit for counting to a start time after said detection circuit detects said commutation and before a current induced in said one of said coils has reached a peak value to deliver a start signal to said second input of said gate, wherein said output of said gate includes PWM signals after said start time;
   and a circuit for discontinuing said PWM signals after said current induced in said one of said coils has reached said peak value.

34. The mass data storage device of claim 33 wherein said PWM signals are derived from said source of clock pulses and has a 50% duty cycle.

35. The mass data storage device of claim 33 wherein said PWM signals are derived from said source of clock pulses and has a duty cycle greater than 50%.

36. The mass data storage device of claim 33 wherein said PWM signals are derived from said source of clock pulses and has a duty cycle less than 50%.

37. The mass data storage device of claim 33 further comprising a circuit for additionally PWM modulating said dc voltage after said current induced in said one of said coils has reached a peak value.

* * * * *